(12) United States Patent
Schroder

(10) Patent No.: US 10,655,395 B2
(45) Date of Patent: May 19, 2020

(54) EARTH-BORING DRILL BITS WITH CONTROLLED CUTTER SPEED ACROSS THE BIT FACE, AND RELATED METHODS

(71) Applicant: Baker Hughes, a GE company, LLC

(72) Inventor: Jon David Schroder, The Woodlands, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 161 days.

(21) Appl. No.: 15/810,737

(22) Filed: Nov. 13, 2017

(65) Prior Publication Data

US 2019/0145175 A1    May 16, 2019

(51) Int. Cl.
| E21B 10/08 | (2006.01) |
| E21B 4/00 | (2006.01) |
| E21B 10/50 | (2006.01) |
| F16H 1/46 | (2006.01) |
| E21B 10/22 | (2006.01) |

(52) U.S. Cl.
CPC ............ *E21B 10/083* (2013.01); *E21B 4/006* (2013.01); *E21B 10/50* (2013.01); *F16H 1/46* (2013.01); *E21B 10/22* (2013.01)

(58) Field of Classification Search
CPC ........ E21B 10/083; E21B 10/50; E21B 10/22; E21B 4/006; E21B 10/00; E21B 10/43; F16H 1/46
See application file for complete search history.

(56) References Cited

U.S. PATENT DOCUMENTS

| 4,775,017 A | 10/1988 | Forrest et al. |
| 5,778,992 A | 7/1998 | Fuller |
| 5,845,721 A * | 12/1998 | Southard ................. E21B 4/006 175/57 |
| 6,378,626 B1 | 4/2002 | Wallace |
| 7,712,549 B2 | 5/2010 | Dennis et al. |
| 2006/0237234 A1 | 10/2006 | Dennis et al. |
| 2013/0118811 A1 | 5/2013 | Fagg |

FOREIGN PATENT DOCUMENTS

| CN | 201250609 Y | 6/2009 |
| CN | 205713989 U | 11/2016 |
| CN | 206035387 U | 3/2017 |
| CN | 106761418 A | 5/2017 |

OTHER PUBLICATIONS

International Written Opinion for International Application No. PCT/US2018/060662 dated Mar. 12, 2019, 7 pages.
International Search Report for International Application No. PCT/US2018/060662 dated Mar. 12, 2019, 3 pages.

* cited by examiner

*Primary Examiner* — Wei Wang
(74) *Attorney, Agent, or Firm* — TraskBritt

(57) ABSTRACT

An earth-boring drill bit includes a bit body including a central shaft having a longitudinal axis, an annular cutter body disposed around, and rotatable relative to, the central shaft, at least one gear assembly operatively coupling the annular cutter body to the central shaft, a first cutter disposed on the central shaft at a first distance from the longitudinal axis, and a second cutter disposed on the annular cutter body at a second, greater distance from the longitudinal axis. Methods of fabricating earth-boring drill bits include rotatably coupling at least one annular cutter body to a central shaft, the at least one annular cutter body and the central shaft being concentric.

20 Claims, 5 Drawing Sheets

EARTH-BORING DRILL BITS WITH CONTROLLED CUTTER SPEED ACROSS THE BIT FACE, AND RELATED METHODS

FIELD

Embodiments of the present disclosure relate generally to earth-boring drill bits, to methods of fabricating earth-boring drill bits, and to methods of forming earth-boring drill bits.

BACKGROUND

Subterranean wellbore formations serve various purposes including, for example, extraction of oil and gas from the subterranean formation and extraction of geothermal heat from the subterranean formation. Wellbores may be formed in a subterranean formation using a drill bit, such as an earth-boring rotary drill bit. Different types of earth-boring rotary drill bits are known in the art, including fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The drill bit is coupled, either directly or indirectly, to an end of what is referred to in the art as a "drill string," which comprises a series of elongated tubular segments connected end-to-end that extends into the wellbore from the surface of the earth above the subterranean formations being drilled. Various tools and components, including the drill bit, may be coupled together at the distal end of the drill string at the bottom of the wellbore being drilled. This assembly of tools and components is referred to in the art as a "bottom hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may include, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore. The downhole motor may be operated with or without drill string rotation.

A drill string may include a number of components in addition to a downhole motor and drill bit including, without limitation, drill pipe, drill collars, stabilizers, measuring while drilling (MWD) equipment, logging while drilling (LWD) equipment, downhole communication modules, and other components.

In addition to drill strings, other tool strings may be disposed in an existing well bore for, among other operations, completing, testing, stimulating, producing, and remediating hydrocarbon-bearing formations.

Cutting elements used in earth boring tools often include polycrystalline diamond compact (often referred to as "PDC") cutting elements, which are cutting elements that include so-called "tables" of a polycrystalline diamond material mounted to supporting substrates and presenting a cutting face for engaging a subterranean formation. Polycrystalline diamond (often referred to as "PCD") material is material that includes inter-bonded grains or crystals of diamond material. In other words, PCD material includes direct, intergranular bonds between the grains or crystals of diamond material.

Cutting elements, also referred to merely as "cutters" in the art, are often mounted on body a drill bit by brazing. The drill bit body is formed with recesses therein, commonly termed "pockets," for receiving a substantial portion of each cutting element in a manner which presents the PCD layer at an appropriate back rake and side rake angle, facing in the direction of intended bit rotation, for cutting in accordance with the drill bit design. In such cases, a brazing compound is applied between the surface of the substrate of the cutting element and the surface of the recess on the bit body in which the cutting element is received. The cutting elements are installed in their respective recesses in the bit body, and heat is applied to each cutting element via a torch to raise the temperature to a point high enough to braze the cutting elements to the bit body in a fixed position but not so high as to damage the PCD layer.

A drill bit employing PDC cutting elements is conventionally rotated under applied weight on bit (WOB), and the PDC cutting elements across the drill bit travel at a particular rotational speed (e.g., in rotations per minute). However, a linear speed of the PDC cutting elements near a longitudinal axis of the drill bit travel at a relatively slow linear speed, while a linear speed of the PDC cutting elements more distant from the longitudinal axis travel at a relatively fast linear speed, proportional to a distance from the longitudinal axis, for a given rotational speed of the bit. Accordingly, the PDC cutting elements near the longitudinal axis may cut (i.e., shear) less formation material than the PDC cutting elements distant from the longitudinal axis, slowing the rate of penetration (ROP) of the bit. In addition, due to the significantly different linear speeds of PDC cutting elements near the longitudinal axis versus those distant therefrom, cutting element wear may not be uniform across the drill bit.

BRIEF SUMMARY

Some embodiments of the present disclosure include earth-boring drill bits, which include a bit body including a central shaft and having a longitudinal axis. An annular cutter body is disposed around the central shaft and rotatable relative to the central shaft about the longitudinal axis. At least one gear assembly operatively couples the annular cutter body to the central shaft. A first cutter is disposed on the central shaft at a first distance from the longitudinal axis, and a second cutter is disposed on the annular cutter body at a second, greater distance from the longitudinal axis of the central shaft.

Further embodiments of the present disclosure include earth-boring drill bit assemblies, which include a downhole motor and a central shaft operatively coupled to the downhole motor. The central shaft includes a longitudinal axis, one or more cutters, and a sun gear circumscribing the central shaft and centered on the longitudinal axis. At least one annular cutter body is disposed around and rotatable relative to the central shaft, the at least one annular cutter body including one or more additional cutters and one or more planetary gears rotatably mounted on the at least one annular cutter body and engaged with the sun gear.

Additional embodiments of the present disclosure include methods of fabricating earth-boring drill bits. According to such methods, at least one annular cutter body is rotatably coupled to a central shaft, the at least one annular cutter body and the central shaft being concentric. At least one planetary gear is rotatably coupled to the at least one annular cutter body. The at least one planetary gear is engaged with a central sun gear on the central shaft. A first group of cutters is positioned on the central shaft at a first distance from a central longitudinal axis of the central shaft. A second group of cutters is positioned on the at least one annular cutter body at a second, greater distance from the central longitudinal axis of the central shaft.

Some embodiments of the present disclosure include methods of forming subterranean boreholes. According to such methods, a central shaft is rotated about a longitudinal axis of the central shaft at a first rotational speed to induce cutters positioned on the central shaft to travel at a first average linear speed. The central shaft includes a sun gear centered on the longitudinal axis. An annular cutter body is rotated about the longitudinal axis at a second rotational speed that is slower than the first rotational speed. The annular cutter body is positioned around the central shaft and includes at least one planetary gear engaged with the sun gear. Cutters positioned on the annular cutter body are induced to travel at a second average linear speed that is substantially the same as the first average linear speed.

DETAILED DESCRIPTION

Figure 1:
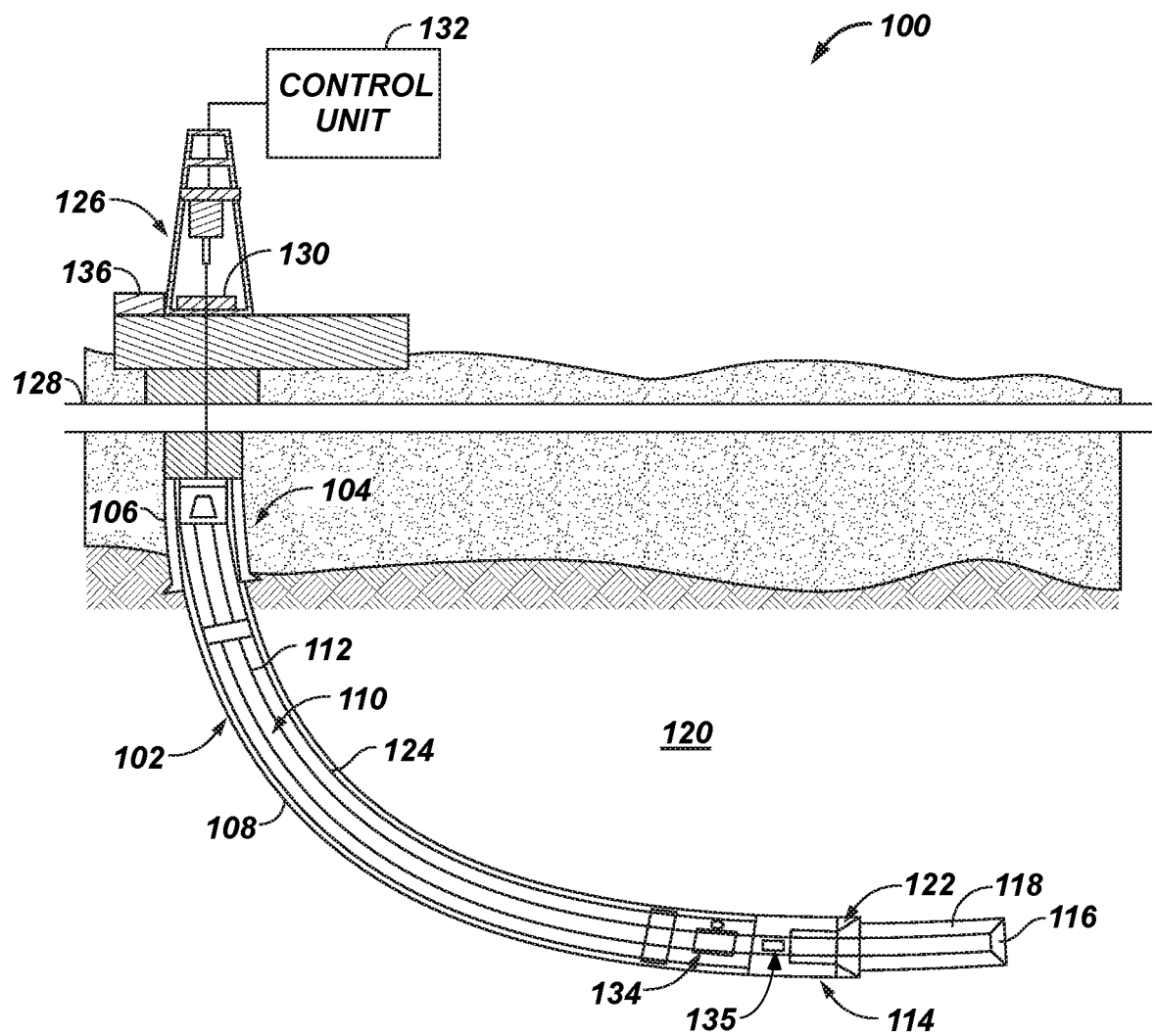
FIG. 1 shows a schematic drawing of a drilling system including an earth-boring drill bit according to one or more embodiments of the present disclosure.

The illustrations presented herein are not actual views of any particular cutting assembly, tool, or drill string, but are merely idealized representations employed to describe example embodiments of the present disclosure. The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Since the details described below may include only those processes, elements, and structures necessary to understand the embodiments of the disclosure, a person having ordinary skill in the art may substitute, replace, or add conventional processes, elements, or structures while remaining within the scope of this disclosure. Also note, any drawings accompanying the application are for illustrative purposes only, and are thus not drawn to scale. Additionally, elements common between figures may have corresponding numerical designations.

As used herein, the term "configured" refers to a size, shape, material composition, and arrangement of one or more of at least one structure and at least one apparatus facilitating operation of one or more of the structure and the apparatus in a predetermined way.

As used herein, spatially relative terms, such as "lower," "bottom," "above," "upper," "top," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90% met, at least 95% met, at least 99% met, or even at least 99.9% met.

As used herein, the term "about" used in reference to a given parameter is inclusive of the stated value and has the meaning dictated by the context (e.g., it includes the degree of error associated with measurement of the given parameter).

As used herein, the term "earth-boring tool" means and includes any type of rotary bit or tool used for drilling during the formation or enlargement of a wellbore and includes, for example, drag bits, core bits, eccentric bits, bi-center bits, reamers, mills, hybrid bits, and other rotary drilling bits and tools known in the art.

FIG. 1 is a schematic drawing of a drilling system 100 including an earth-boring tool in the form of an earth-boring drill bit according to one or more embodiments of the present disclosure. FIG. 1 shows a wellbore 102 that may include an upper section 104 with a casing 106 installed therein and a lower section 108 that is being drilled with a drill string 110. The drill string 110 may include a tubular member 112 that carries a drilling assembly 114 at its bottom end. The tubular member 112 may be coiled tubing or may be formed by joining drill pipe sections. A pilot bit 116 (also referred to as a "drill bit") may be attached to the bottom end of the drilling assembly 114 for drilling a first, relatively smaller diameter borehole 118 in a formation 120. A reamer 122 may be placed above or uphole of the pilot bit 116 in the drill string 110 to enlarge the first diameter borehole 118 to a second, relatively larger diameter borehole 124.

The drill string 110 may extend to a rig 126 at a surface 128 of the formation in which the wellbore 102 is being formed. The rig 126 is shown on land for ease of explanation, but the apparatus and methods disclosed herein equally apply to an offshore rig 126 used for drilling underwater. A rotary table 130 or a top drive may rotate drill string 110 and drilling assembly 114, and thus rotate pilot bit 116 and reamer 122, to respectively form boreholes 118 and 124. The rig 126 may include conventional devices, such as mechanisms to add additional sections to the tubular member 112 as the wellbore 102 is drilled. A control unit 132 (e.g., a computer-based unit) may receive and process downhole data transmitted by the drilling assembly 114. For example, the control unit 132 may control operations of various devices or sensors 135 used in drilling assembly 114. A drilling fluid 136 (e.g., "mud") may be pumped under pressure through tubular member 112 and may discharge at the bottom of the wellbore 102 through the pilot bit 116, for example. Drilling fluid 136 may return to the surface via the annular space (also referred to as the "annulus") between drill string 110 and an inside wall of the wellbore 102.

During operation, rotation of the drill string 110 at the rig 126 may rotate both the pilot bit 116 and the reamer 122. In some embodiments, rotation of the pilot bit 116 and/or reamer 122 may be accomplished with a downhole motor 134. Pilot bit 116 may drill a first, smaller diameter borehole 118, while simultaneously the reamer 122 may enlarge the smaller borehole 118 to a second, larger diameter borehole 124. The earth's subsurface formation may contain rock strata made up of different rock structures that can vary from soft formations to very hard formations. Pilot bit 116 and/or reamer 122 may be selected based on the expected subsurface formations in a specific drilling operation.

Figure 2:
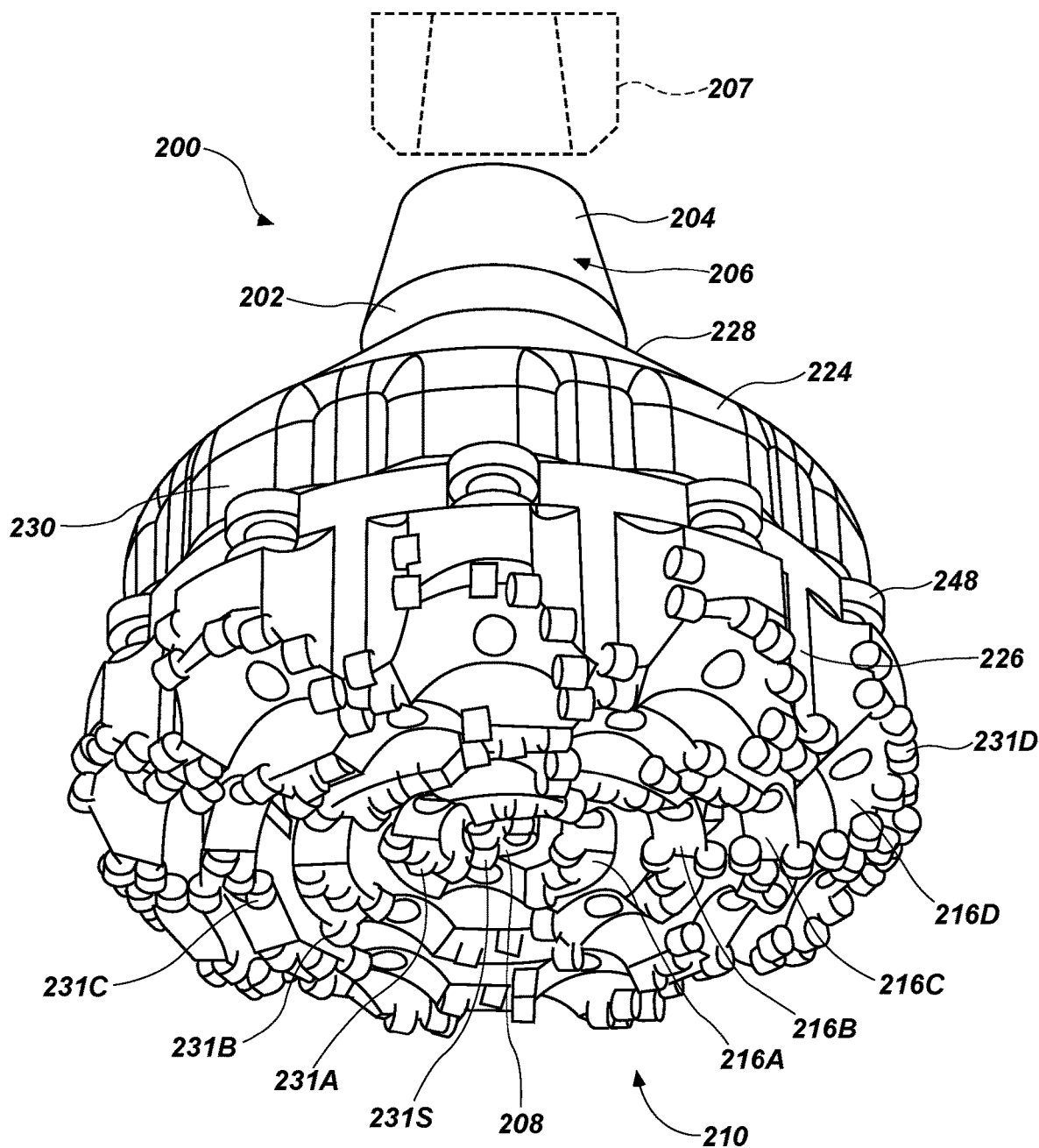
FIG. 2 shows a bottom perspective view of an earth-boring drill bit according to one or more embodiments of the present disclosure.
Figure 3:
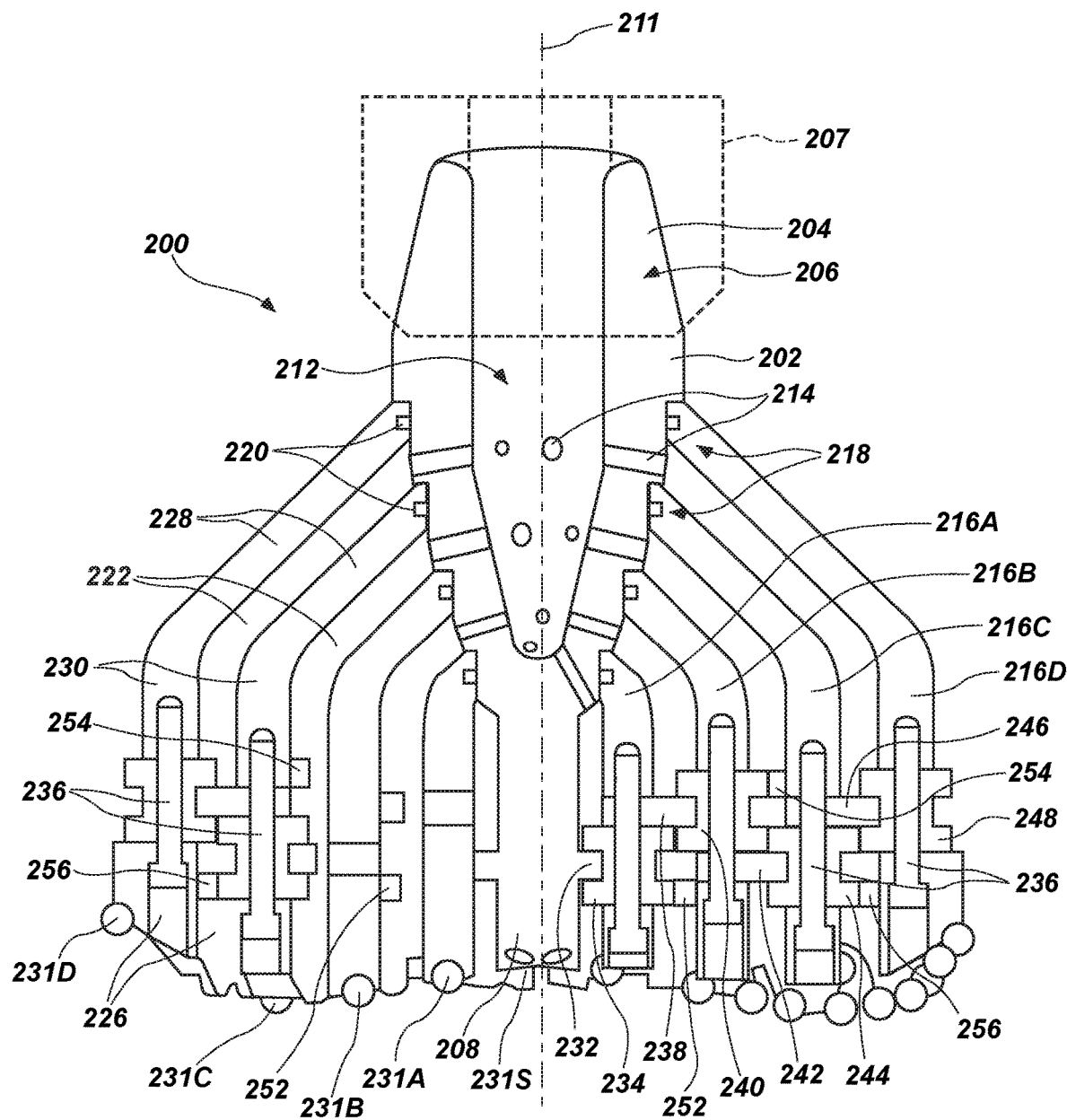
FIG. 3 shows a cross-sectional side view of the earth-boring drill bit of FIG. 2.

FIG. 2 shows a bottom perspective view of an earth-boring tool in the form of drill bit 200 according to one or more embodiments of the present disclosure. FIG. 3 shows a cross-sectional view of the earth-boring drill bit of FIG. 2. For example, the drill bit 200 may be used as the pilot bit 116 shown in FIG. 1. Referring to FIGS. 2 and 3, the drill bit 200 may include a bit body 202 including a shank 204 having a threaded connection pin portion 206 (e.g., an American Petroleum Institute (API) threaded connection portion). The threaded connection pin portion 206 may directly attach the drill bit 200 to a drill string (e.g., the drill string 110 shown in FIG. 1) or to a drive shaft 207 (shown in FIG. 2 in dashed lines) of a downhole motor. As shown in FIG. 3, the bit body 202 may also include a central shaft 208 extending downward from the shank 204 to a face 210 of the drill bit 200. Because of the direct connection between the drill string or drive shaft 207 and the bit body 202, when the drill string or drive shaft 207 is rotated, the central shaft 208 may be directly rotated about a longitudinal axis 211 of the bit body 202 at a same rotational speed as the drill string or drive shaft 207. The bit body 202 may include a flowbore 212 extending into the shank 204. Fluid passageways 214 may extend between the flowbore 212 and an outer surface of the shank 204.

One or more annular cutter bodies 216 may be disposed around the central shaft 208 and rotatable relative to the central shaft 208 about the longitudinal axis 211 of the bit body 202. For example, proceeding radially outward from the central shaft 208, a first annular cutter body 216A, a second annular cutter body 216B, a third annular cutter body 216C, and a fourth annular cutter body 216D (collectively referred to as the annular cutter bodies 216) may each be rotatably coupled to the bit body 202 around the central shaft 208. The central shaft 208 and the first annular cutter body 216A may correspond to a cone region of the drill bit 200. The second annular cutter body 216B may correspond to a nose region of the drill bit 200. The third annular cutter body 216C may correspond to a shoulder region of the drill bit 200. The fourth annular cutter body 216D may correspond to a gage region of the drill bit 200. The annular cutter bodies 216 and the central shaft 208 may be concentric relative to each other.

The annular cutter bodies 216 may be configured to slidably rotate about the bit body 202. For example, upper end portions 218 of the annular cutter bodies 216 may abut against respective exterior shoulders formed in the bit body 202. A sealing element 220 (e.g., an O-ring) may be positioned between each of the upper end portions 218 and the bit body 202. In some embodiments, one or more bearing elements (e.g., ball bearings, bearing pads, etc.) may also be included at an interface between the upper end portions 218 of the annular cutter bodies 216 and the bit body 202 to facilitate relative rotation and to reduce wear between the annular cutter bodies 216 and the bit body 202. The fluid passageways 214 in the bit body 202 may extend between the flowbore 212 and respective spaces 222 between the central shaft 208 and the first annular cutter body 216A and between the annular cutter bodies 216.

Each of the annular cutter bodies 216 may include an upper portion 224 and a lower portion 226. The upper portions 224 may include the upper end portions 218 coupled to (e.g., abutting against) the bit body 202. The upper portions 224 of the annular cutter bodies 216 may include a frustoconical upper portion 228 and a generally cylindrical lower portion 230. The lower portions 226 of the annular cutter bodies 216 may be generally cylindrical, and may define the face 210 of the drill bit 200. Cutters 231 may be attached to (e.g., brazed to, press-fit to, welded to, etc.) the lower portions 226 of the annular cutter bodies 216 at the face 210 of the drill bit 200. The upper portion 224 and lower portion 226 of each of the annular cutter bodies 216 may be integral with each other, or may be coupled to each other (e.g., by one or more of bolts, pins, welds, brazes, mechanical interference, etc.).

The cutters 231 may include PDC cutters (e.g., shearing cutting elements), and/or may include other cutting elements, such as tooth-shaped gouging cutting elements, for example.

The annular cutter bodies 216 may be operatively coupled to each other and to the central shaft 208 through sun and planetary gear assemblies, in series. For example, a first sun gear 232 may extend radially outward from the central shaft 208. The first sun gear 232 may be an integral part of the central shaft 208, or may be coupled to the central shaft 208 (e.g., via threads, welding, brazing, a press fit, bolts, pins, etc.). The first sun gear 232 may have a center located on the longitudinal axis 211 of the bit body 202. One or more first planetary gears 234 may be rotatably coupled to the first annular cutter body 216A (such as with pins 236) and operatively engaged with the first sun gear 232. Thus, the first annular cutter body 216A may rotate about the central shaft 208 as the one or more first planetary gears 234 engage with and roll around the first sun gear 232.

Similarly, a second sun gear 238 may extend radially outward from the first annular cutter body 216A. The second sun gear 238 may be an integral part of the first annular cutter body 216A, or may be coupled to the first annular cutter body 216A (e.g., via threads, welding, brazing, a press fit, bolts, pins, etc.). The second sun gear 238 may have a center located on the longitudinal axis 211 of the bit body 202. One or more second planetary gears 240 may be rotatably coupled to the second annular cutter body 216B (such as with pins 236) and operatively engaged with the second sun gear 238. Thus, the second annular cutter body 216B may rotate about the first annular cutter body 216A and/or about the central shaft 208 as the one or more second planetary gears 240 engage with and roll around the second sun gear 238.

A third sun gear 242 may extend radially outward from the second annular cutter body 216B. The third sun gear 242 may be an integral part of the second annular cutter body 216B, or may be coupled to the second annular cutter body 216B (e.g., via threads, welding, brazing, a press fit, bolts, pins, etc.). The third sun gear 242 may have a center located on the longitudinal axis 211 of the bit body 202. One or more third planetary gears 244 may be rotatably coupled to the third annular cutter body 216C (such as with pins 236) and operatively engaged with the third sun gear 242. Thus, the third annular cutter body 216C may rotate about the second annular cutter body 216B, about the first annular cutter body 216A, and/or about the central shaft 208 as the one or more third planetary gears 244 engage with and roll around the third sun gear 242.

A fourth sun gear 246 may extend radially outward from the third annular cutter body 216C. The fourth sun gear 246 may be an integral part of the third annular cutter body 216C, or may be coupled to the third annular cutter body 216C (e.g., via threads, welding, brazing, a press fit, bolts, pins, etc.). The fourth sun gear 246 may have a center located on the longitudinal axis 211 of the bit body 202. One or more fourth planetary gears 248 may be rotatably coupled to the fourth annular cutter body 216D (such as with pins 236) and operatively engaged with the fourth sun gear 246. Thus, the fourth annular cutter body 216D may rotate about the third annular cutter body 216C, about the second annular cutter body 216B, about the first annular cutter body 216A, and/or about the central shaft 208 as the one or more fourth planetary gears 248 engage with and roll around the fourth sun gear 246.

During operation, the cutters 231 may contact and press against a formation to be drilled under applied WOB. The pressing of the cutters 231 against the formation may provide resistance to rotation of the drill bit 200 and its annular cutter bodies 216. However, further rotation of the central shaft 208 of the bit body 202 may drive, through engagement of the gear assemblies described above, rotation of the various annular cutter bodies 216. The rotational speed (e.g., in rotations per minute ("RPM")) of each of the annular cutter bodies 216 may be proportional to, and slower than, the rotational speed of the central shaft 208. Proceeding successively from the first annular cutter body 216A (i.e., the innermost annular cutter body 216) to the fourth annular cutter body 216D (i.e., the outermost annular cutter body 216), the rotational speed of the annular cutter bodies 216 may be progressively slower. The rotational speed of each of the annular cutter bodies 216 may be determined by the gear ratios of the gear assemblies described above. The gear ratios of the gear assemblies may be selected and configured to result in an average linear speed (e.g., in feet per second) of the cutters 231 that is substantially the same on each of the annular cutter bodies 216 and on the central shaft 208. For example, during operation, all of the cutters 231 on the annular cutter bodies 216 may have a linear speed that is within about ±10%, within about ±5%, or within about ±1% of a linear speed of the cutters 231 on the central shaft 208.

Figure 4:
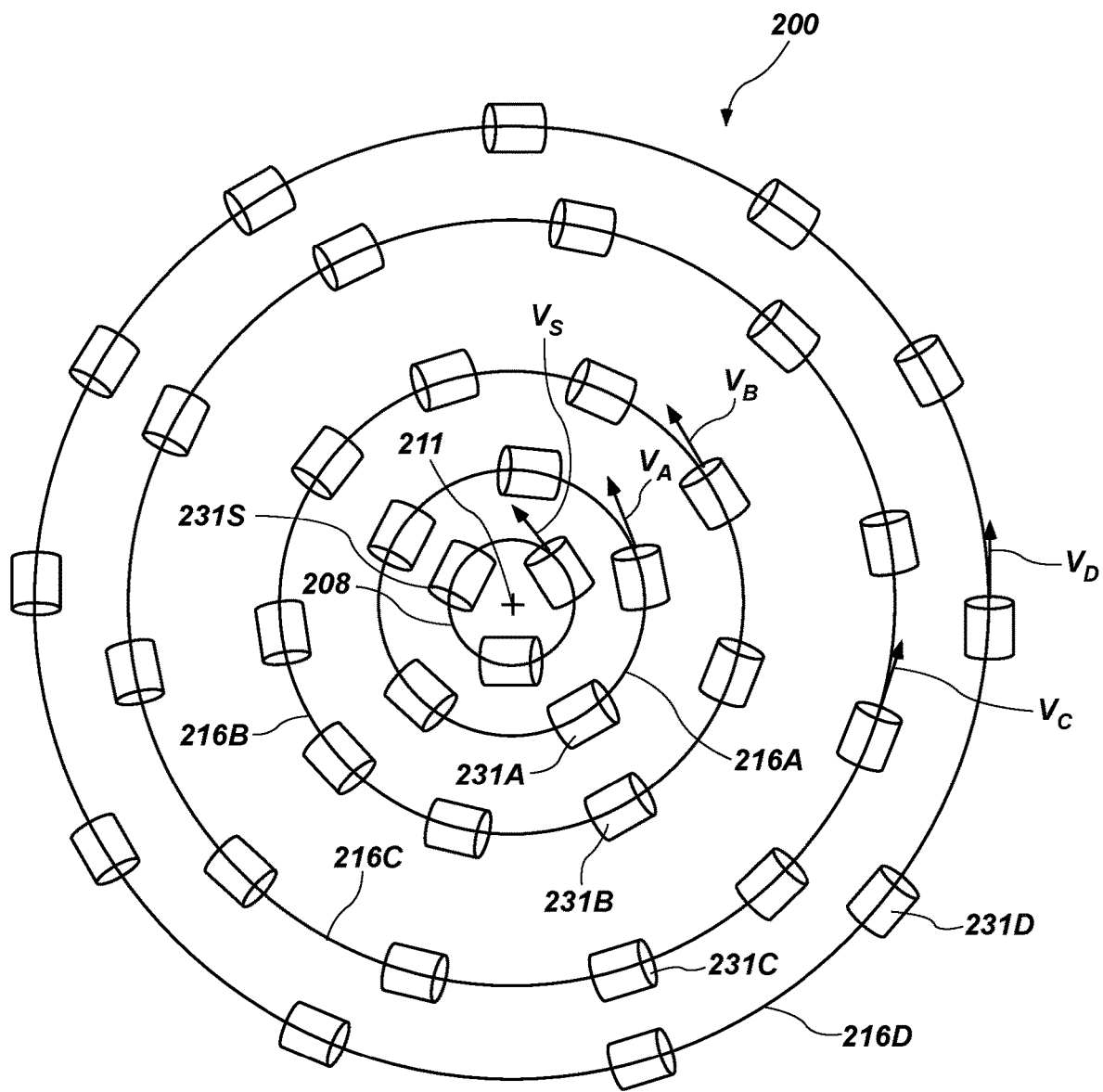
FIG. 4 is schematic illustration of the earth-boring drill bit of FIG. 2, including annular cutter bodies and cutters positioned thereon.

Referring to FIG. 4, the cutters 231 on a particular annular cutter body 216, such as the cutters 231A on the first annular cutter body 216A, may be distributed at different radial distances from the longitudinal axis 211. For example, some of the cutters 231A may be located on an inner side of the first annular cutter body 216A, some of the cutters 231A may be located approximately at a radially central location on the first annular cutter body 216A, and some of the cutters 231A may be located on an outer side of the first annular cutter body 216A. In such a configuration, the cutters 231A on the first annular cutter body 216A may travel at different linear speeds while the first annular cutter body 216A rotates about the longitudinal axis 211, due to relative different distances of the cutters 231A from the longitudinal axis 211.

However, the average linear speed VA of the cutters 231A on the first annular cutter body 216A may be substantially the same as (e.g., within about ±10% of, within about ±5% of, or within about ±1% of) an average linear speed Vs of the cutters 231S on the central shaft 208. By way of illustration, if an average linear speed of the cutters 231S on the central shaft 208 is about 1.0 foot per second, then the average linear speed VA-D of the cutters 231A-D on each of the respective annular cutter bodies 216A-216D may be substantially the same, which may be between about 0.9 foot per second and about 1.1 feet per second (for a variance of about ±10%).

Although the drill bit 200 is illustrated in FIGS. 2-4 as including four annular cutter bodies 216A-216D rotatably coupled to the central shaft 208, this disclosure is not so limited. Rather, any number of annular cutter bodies 216 may be rotatably coupled to the central shaft 208, such as one, two, three, four, or more than four annular cutter bodies 216.

Figure 5:
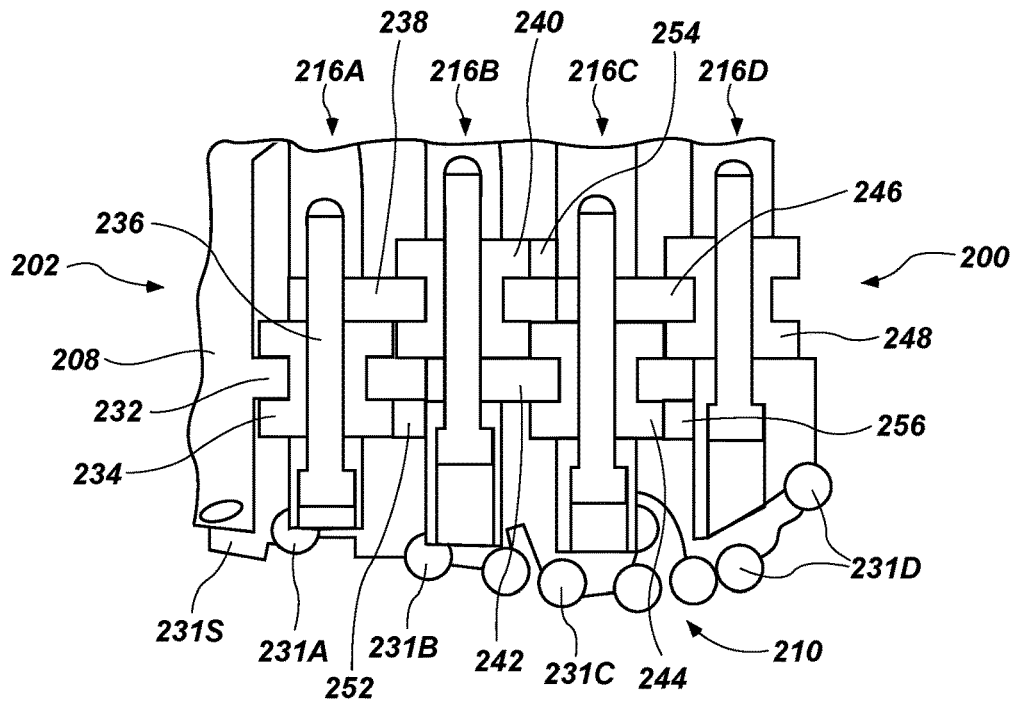
FIG. 5 shows a partial cross-sectional view of the earth-boring drill bit of FIG. 2, illustrating a detailed view of an interaction between gears thereof.
Figure 6:
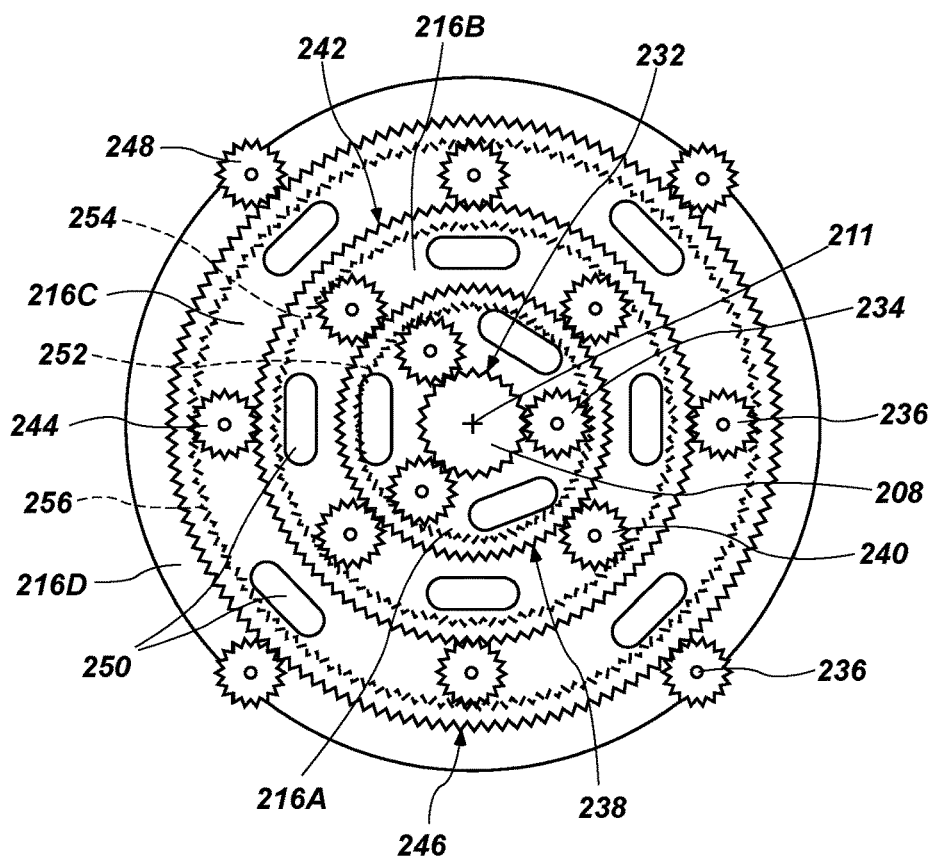
FIG. 6 is a schematic illustration of an interaction between gears of the earth-boring drill bit of FIG. 2.

FIGS. 5 and 6 illustrate an interaction between gears of the earth-boring drill bit 200 according to embodiments of the present disclosure. As shown in FIGS. 5 and 6, and as described above in relation to FIGS. 2-4, the drill bit 200 may include the bit body 202 having the longitudinal axis 211, the central shaft 208 of the bit body 202, the annular cutter bodies 216 (including first annular cutter body 216A, second annular cutter body 216B, third annular cutter body 216C, and fourth annular cutter body 216D) rotatably coupled to the central shaft 208, and cutters 231 (including cutters 231S, 231A, 231B, 231C, and 231D, as shown in FIG. 5) coupled to the central shaft 208 and the annular cutter bodies 216 at the face 210 of the drill bit 200. The first sun gear 232 may extend radially outward from the central shaft 208, with a center thereof located on the longitudinal axis 211 of the bit body 202. The second sun gear 238 may extend radially outward from the first annular cutter body 216A. The third sun gear 242 may extend radially outward from the second annular cutter body 216B. The fourth sun gear 246 may extend radially outward from the third annular cutter body 216C. The one or more first planetary gears 234 may be rotatably coupled to the first annular cutter body 216A (such as with the pins 236) and operatively engaged with the first sun gear 232. The one or more second planetary gears 240 may be rotatably coupled to the second annular cutter body 216B (such as with the pins 236) and operatively engaged with the second sun gear 238. The one or more third planetary gears 244 may be rotatably coupled to the third annular cutter body 216C (such as with the pins 236) and operatively engaged with the third sun gear 242. The one or more fourth planetary gears 248 may be rotatably coupled to the fourth annular cutter body 216D (such as with pins 236) and operatively engaged with the fourth sun gear 246.

As shown in FIGS. 3, 5, and 6, radially outer portions of the first, second, and third planetary gears 234, 240, 244 may be engaged with first, second, and third internal gears 252, 254, 256, respectively. The internal gears 252, 254, and 256 are shown in FIG. 6 as dashed lines for convenience, to distinguish them from the sun gears 232, 238, 242. The first internal gear 252 may extend radially inward from the second annular cutter body 216B. The second internal gear 254 may extend radially inward from the third annular cutter body 216C. The third internal gear 256 may extend radially inward from the fourth annular cutter body 216D. Accordingly, each of the first, second, and third planetary gears 234, 240, 244 may be positioned between, and be engaged with, one of the first, second, and third sun gears 232, 238, 242 and one of the internal gears 252, 254, 256, respectively. Outer portions of the fourth planetary gears 248 may be positioned and configured to engage with a formation to be drilled by the drill bit 200. Accordingly, when the central shaft 208 is rotated, the planetary gears 234, 240, 244, 248 may be caused to rotate about their axes, and the annular cutter bodies 216 may be caused to rotate about the longitudinal axis 211 of the bit body 202.

The gear assemblies described above may enable control of rotational speed and linear speed of the cutters 231 as the drill bit 200 is in operation. For example, when the central shaft 208 is actively rotated (by, e.g., a downhole motor) and the cutters 231 engage a formation to be drilled, a drag force on the cutters 231 may cause the gear assemblies to engage and to control a rotational speed of the annular cutter bodies 216 and a resulting linear speed and the cutters 231.

One or more of the sun gears 232, 238, 242, 246 may include a fluid opening 250 through which drilling fluid may pass during operation, such as to cool the cutters 231 and to flush away cuttings. In addition, drilling fluid may pass around and past radially outer edges of the sun gears 232, 238, 242, 246.

Accordingly, embodiments of the drill bit 200 of this disclosure may include annular cutter bodies 216 that rotate at different rotational speeds to result in cutters 231 having linear speeds that are substantially the same across the drill bit 200 (e.g., the cone, nose, shoulder, and gage regions of drill bit 200). Accordingly, in some embodiments, the cutters 231 at the different regions of the drill bit 200 may wear at substantially similar rates. In addition, in some embodiments, the rate of penetration (ROP) and weight on bit (WOB) may be spread substantially evenly between the various cutters 231, such that the cutters 231 may each experience substantially similar forces and stresses.

In operation, the central shaft 208 may be rotated at a first rotational speed (e.g., in rotations per minute) about a longitudinal axis 211 thereof, such as with a downhole motor or by rotating a drill string coupled to the drill bit 200. Rotation of the central shaft 208 may induce cutters 231S positioned on the central shaft 208 to travel at a first average linear speed. The first sun gear 232 of the central shaft 208 may be rotated about the longitudinal axis 211 together with the central shaft 208. The first annular cutter body 216A, which may be positioned around the central shaft 208 and which may include the one or more first planetary gears 234 and cutters 231A, may be rotated about the longitudinal axis 211 at a second rotational speed that is slower than the first rotational speed. The second rotational speed may result in an average linear speed of the cutters 231A on the first annular cutter body 216A that is substantially the same as (e.g., within about ±10% of, within about ±5% of, or within about ±1% of) the average linear speed of the cutters 231S positioned on the central shaft 208. In embodiments including additional annular cutter bodies 216 (e.g., the annular cutter bodies 216B-216D), the additional annular cutter bodies 216 be rotated in a similar fashion to the rotation of the first annular cutter body 216A described above. The cutters 231 on each of the of the annular cutter bodies 216 and on the central shaft 208 may each travel at substantially the same average linear speed as each other while the central shaft 208 is rotated.

Additional non-limiting example embodiments of the disclosure are described below.

Embodiment 1

An earth-boring drill bit, comprising: a bit body including a central shaft and having a longitudinal axis; an annular cutter body disposed around the central shaft and rotatable relative to the central shaft about the longitudinal axis; at least one gear assembly operatively coupling the annular cutter body to the central shaft; a first cutter disposed on the central shaft at a first distance from the longitudinal axis; and a second cutter disposed on the annular cutter body at a second, greater distance from the longitudinal axis of the central shaft.

Embodiment 2

The earth-boring drill bit of Embodiment 1, wherein the at least one gear assembly is sized and configured to result in a linear speed of the second cutter that is within about 10% of a linear speed of the first cutter when the earth-boring drill bit is in use to form a borehole.

Embodiment 3

The earth-boring drill bit of Embodiment 1 or Embodiment 2, wherein the at least one gear assembly is sized and configured to result in a linear speed of the second cutter that is within about 5% of a linear speed of the first cutter when the earth-boring drill bit is in use to form a borehole.

Embodiment 4

The earth-boring drill bit of any of Embodiments 1 through 3, further comprising at least one additional annular cutter body disposed around the central shaft and around the annular cutter body, the at least one additional annular cutter body being rotatable relative to both the central shaft and the annular cutter body about the longitudinal axis.

Embodiment 5

The earth-boring drill bit of Embodiment 4, further comprising at least a third cutter disposed on the at least one additional annular cutter body at a third distance from the longitudinal axis of the bit body greater than both the first distance and second distance.

Embodiment 6

The earth-boring drill bit of Embodiment 5, wherein the first cutter is located in a cone region of the earth-boring drill bit, the second cutter is located in a nose region of the earth-boring drill bit, and the at least a third cutter is located in a shoulder region of the earth-boring drill bit.

Embodiment 7

The earth-boring drill bit of any of Embodiments 1 through 6, wherein the at least one gear assembly comprises at least one planetary gear rotatably coupled to the annular cutter body and engaged with a sun gear of the central shaft.

Embodiment 8

An earth-boring drill bit assembly, comprising: a downhole motor; a central shaft operatively coupled to the downhole motor, the central shaft comprising a longitudinal axis, one or more cutters, and a sun gear circumscribing the central shaft and centered on the longitudinal axis; and at least one annular cutter body disposed around and rotatable relative to the central shaft, the at least one annular cutter body comprising one or more additional cutters and one or more planetary gears rotatably mounted on the at least one annular cutter body and engaged with the sun gear.

Embodiment 9

The earth-boring drill bit assembly of Embodiment 8, wherein the at least one annular cutter body comprises a first annular cutter body and a second annular cutter body, the second annular cutter body disposed around the first annular cutter body and the central shaft.

Embodiment 10

The earth-boring drill bit assembly of Embodiment 9, wherein the second annular cutter body comprises: one or more additional planetary gears rotatably mounted on the second annular cutter body and engaged with another sun gear disposed on the first annular cutter body; and an internal gear extending inward from the second annular cutter body and engaged with the one or more planetary gears rotatably mounted on the at least one annular cutter body.

Embodiment 11

The earth-boring drill bit assembly of Embodiment 10, wherein the sun gear comprises a unitary sun gear extending radially outward from the central shaft.

Embodiment 12

The earth-boring drill bit assembly of any of Embodiments 8 through 11, wherein the one or more planetary gears comprises three or more planetary gears that are positioned on the at least one annular cutter body at a common radial distance from the longitudinal axis of the central shaft and at substantially equal distances from each other around the at least one annular cutter body.

Embodiment 13

The earth-boring drill bit assembly of any of Embodiments 8 through 12, wherein the at least one annular cutter body comprises an upper portion rotatably coupled to the central shaft and a lower portion to which the one or more additional cutters are coupled.

Embodiment 14

The earth-boring drill bit assembly of any of Embodiments 8 through 13, further comprising one or more fluid openings through the sun gear for conducting drilling fluid between the central shaft and the at least one annular cutter body when the earth-boring drill bit assembly is in use.

Embodiment 15

The earth-boring drill bit assembly of Embodiment 14, further comprising at least one sealing element positioned between the central shaft and the at least one annular cutter body.

Embodiment 16

A method of fabricating an earth-boring drill bit, comprising: rotatably coupling at least one annular cutter body to a central shaft, the at least one annular cutter body and the central shaft being concentric; rotatably coupling at least one planetary gear to the at least one annular cutter body; engaging the at least one planetary gear with a central sun gear on the central shaft; positioning a first group of cutters on the central shaft at a first distance from a central longitudinal axis of the central shaft; and positioning a second group of cutters on the at least one annular cutter body at a second, greater distance from the central longitudinal axis of the central shaft.

Embodiment 17

The method of Embodiment 16, wherein rotatably coupling the at least one annular cutter body to the central shaft comprises rotatably coupling a first annular cutter body and a second annular cutter body to the central shaft, the first annular cutter body also rotatable relative to the second annular cutter body.

Embodiment 18

The method of Embodiment 17, further comprising positioning a third group of cutters on the second annular cutter body at a third distance from the central longitudinal axis of the central shaft, the third distance being greater than the second distance.

Embodiment 19

The method of any of Embodiments 16 through 18, further comprising operatively connecting a downhole motor to the central shaft to rotate the first group of cutters about the central longitudinal axis at a first rotational speed and, through the central sun gear and the at least one planetary gear, to rotate the second group of cutters about the central longitudinal axis at a second, slower rotational speed when the earth-boring drill bit is in use.

Embodiment 20

The method of any of Embodiments 16 through 19, wherein rotatably coupling the at least one planetary gear to the at least one annular cutter body comprises rotatably coupling at least two planetary gears to the at least one annular cutter body.

Embodiment 21

A method of forming a subterranean borehole, comprising: rotating a central shaft about a longitudinal axis of the central shaft at a first rotational speed to induce cutters positioned on the central shaft to travel at a first average linear speed, the central shaft comprising a sun gear centered on the longitudinal axis; and rotating an annular cutter body about the longitudinal axis at a second rotational speed that is slower than the first rotational speed, the annular cutter body positioned around the central shaft and comprising at least one planetary gear engaged with the sun gear, to induce cutters positioned on the annular cutter body to travel at a second average linear speed that is substantially the same as the first average linear speed.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as claimed, including legal equivalents thereof. In addition, features from one embodiment may be combined with features of another embodiment while still being encompassed within the scope of the invention as contemplated by the inventors. Further, embodiments of the disclosure have utility with different and various tool types and configurations.

What is claimed is:

1. An earth-boring drill bit, comprising:
    a bit body including a central shaft and having a longitudinal axis;
    an annular cutter body disposed around the central shaft and rotatable relative to the central shaft about the longitudinal axis;
    at least one gear assembly operatively coupling the annular cutter body to the central shaft;
    a first cutter disposed on the central shaft at a first distance from the longitudinal axis; and
    a second cutter disposed on the annular cutter body at a second, greater distance from the longitudinal axis of the central shaft, wherein the at least one gear assembly is sized and configured to result in a linear speed of the second cutter that is within about 10% of a linear speed of the first cutter when the earth-boring drill bit is in use to form a borehole.

2. The earth-boring drill bit of claim 1, wherein the at least one gear assembly is sized and configured to result in a linear speed of the second cutter that is within about 5% of a linear speed of the first cutter when the earth-boring drill bit is in use to form a borehole.

3. The earth-boring drill bit of claim 1, further comprising at least one additional annular cutter body disposed around the central shaft and around the annular cutter body, the at least one additional annular cutter body being rotatable relative to both the central shaft and the annular cutter body about the longitudinal axis.

4. The earth-boring drill bit of claim 3, further comprising at least a third cutter disposed on the at least one additional annular cutter body at a third distance from the longitudinal axis of the bit body greater than both the first distance and second distance.

5. The earth-boring drill bit of claim 4, wherein the first cutter is located in a cone region of the earth-boring drill bit, the second cutter is located in a nose region of the earth-boring drill bit, and the at least a third cutter is located in a shoulder region of the earth-boring drill bit.

6. The earth-boring drill bit of claim 1, wherein the at least one gear assembly comprises at least one planetary gear rotatably coupled to the annular cutter body and engaged with a sun gear of the central shaft.

7. An earth-boring drill bit assembly, comprising:
    a downhole motor;
    a central shaft operatively coupled to the downhole motor, the central shaft comprising a longitudinal axis, one or more cutters, and a sun gear circumscribing the central shaft and centered on the longitudinal axis;
    a first annular cutter body disposed around and rotatable relative to the central shaft, the first annular cutter body comprising one or more additional cutters and one or more planetary gears rotatably mounted on the first annular cutter body and engaged with the sun gear; and
    a second annular cutter body disposed around the first annular cutter body and the central shaft and comprising:
        one or more additional planetary gears rotatably mounted on the second annular cutter body and engaged with another sun gear disposed on the first annular cutter body; and
        an internal gear extending inward from the second annular cutter body and engaged with the one or more planetary gears rotatably mounted on the at least one annular cutter body.

8. The earth-boring drill bit assembly of claim 7, wherein the sun gear comprises a unitary sun gear extending radially outward from the central shaft.

9. The earth-boring drill bit assembly of claim 7, wherein the one or more planetary gears comprises three or more planetary gears that are positioned on the at least one annular cutter body at a common radial distance from the longitudinal axis of the central shaft and at substantially equal distances from each other around the first annular cutter body.

10. The earth-boring drill bit assembly of claim 7, wherein the first annular cutter body comprises an upper portion rotatably coupled to the central shaft and a lower portion to which the one or more additional cutters are coupled.

11. The earth-boring drill bit assembly of claim 7, further comprising one or more fluid openings through the sun gear for conducting drilling fluid between the central shaft and the first annular cutter body when the earth-boring drill bit assembly is in use.

12. The earth-boring drill bit assembly of claim 11, further comprising at least one sealing element positioned between the central shaft and the first annular cutter body.

13. The earth-boring drill bit assembly of claim 7, wherein the one or more planetary gears and the sun gear are sized and configured to result in a linear speed of the one or more additional cutters of the first annular cutter body that is within about 10% of a linear speed of the one or more cutters of the central shaft when the earth-boring drill bit is in use to form a borehole.

14. The earth-boring drill bit assembly of claim 7, wherein the one or more planetary gears and the sun gear are sized and configured to result in a linear speed of the one or more additional cutters of the first annular cutter body that is within about 5% of a linear speed of the one or more cutters of the central shaft when the earth-boring drill bit is in use to form a borehole.

15. The earth-boring drill bit assembly of claim 7, wherein the one or more cutters are located in a cone region of the earth-boring drill bit, the one or more additional cutters are located in a nose region or shoulder region of the earth-boring drill bit.

16. A method of fabricating an earth-boring drill bit, comprising:
    rotatably coupling at least one annular cutter body to a central shaft, the at least one annular cutter body and the central shaft being concentric;
    rotatably coupling at least one planetary gear to the at least one annular cutter body;
    engaging the at least one planetary gear with a central sun gear on the central shaft;
    positioning a first group of cutters on the central shaft at a first distance from a central longitudinal axis of the central shaft; and
    positioning a second group of cutters on the at least one annular cutter body at a second, greater distance from the central longitudinal axis of the central shaft, wherein the at least one annular cutter body and the second group of cutters are configured to rotate at a second, slower rotational speed relative to a first rotational speed of the central shaft and the first group of cutters.

17. The method of claim 16, wherein rotatably coupling the at least one annular cutter body to the central shaft comprises rotatably coupling a first annular cutter body and a second annular cutter body to the central shaft, the first annular cutter body also rotatable relative to the second annular cutter body.

18. The method of claim 17, further comprising positioning a third group of cutters on the second annular cutter body at a third distance from the central longitudinal axis of the central shaft, the third distance being greater than the second distance.

19. The method of claim 16, further comprising operatively connecting a downhole motor to the central shaft to rotate the first group of cutters about the central longitudinal axis at the first rotational speed and, through the central sun gear and the at least one planetary gear, to rotate the second group of cutters about the central longitudinal axis at the second, slower rotational speed when the earth-boring drill bit is in use.

20. The method of claim 16, wherein rotatably coupling the at least one planetary gear to the at least one annular cutter body comprises rotatably coupling at least two planetary gears to the at least one annular cutter body.

\* \* \* \* \*